(12) United States Patent
Mottard

(10) Patent No.: US 7,490,578 B1
(45) Date of Patent: Feb. 17, 2009

(54) APPARATUS FOR REMOVING ODOR FROM ANIMAL DEPOSITS

(75) Inventor: Mark Alan Mottard, Milton, FL (US)

(73) Assignee: Kleen Kat Inc., Gulf Breeze, FL (US)

( * ) Notice: Subject to any disclaimer, the term of this patent is extended or adjusted under 35 U.S.C. 154(b) by 121 days.

(21) Appl. No.: 11/500,523

(22) Filed: Aug. 7, 2006

Related U.S. Application Data

(63) Continuation-in-part of application No. 10/410,115, filed on Apr. 9, 2003, now abandoned.

(51) Int. Cl.
*A01K 1/035* (2006.01)
*A01K 29/00* (2006.01)

(52) U.S. Cl. .............. 119/161; 422/5; 422/62; 422/120; 422/121; 422/186; 119/163; 119/165

(58) Field of Classification Search .......... 422/62, 422/121, 5, 120, 186, 186.3; 119/161, 165, 119/163
See application file for complete search history.

(56) References Cited

U.S. PATENT DOCUMENTS

| | | | |
|---|---|---|---|
| 4,998,504 A | 3/1991 | Ball | |
| 5,755,181 A | 5/1998 | Petkovski | |
| 5,782,206 A * | 7/1998 | Markowitz | 119/622 |
| 6,123,048 A * | 9/2000 | Alkire et al. | 119/500 |
| 6,295,949 B1 * | 10/2001 | Willis | 119/165 |
| 6,354,243 B1 * | 3/2002 | Lewis et al. | 119/165 |
| 6,656,424 B1 | 12/2003 | Deal | |
| 6,857,391 B1 | 2/2005 | Gannt | |

* cited by examiner

*Primary Examiner*—Sean E Conley

(57) ABSTRACT

An apparatus and method for removing odor from animal deposits includes a container with an opening and with a germicidal emission device connected to the inside of the container such that no germicidal emissions are directed at the opening. A power source is connected to the germicidal emission device. A motion detector is connected inside the contained such that the motion detector detects motion through the opening outside of the container and further where the motion detector is connected to the power source and to the germicidal emission device such that the motion detector turns on the germicidal emission device when no motion is detected inside or outside of the container.

15 Claims, 5 Drawing Sheets

APPARATUS FOR REMOVING ODOR FROM ANIMAL DEPOSITS

CROSS REFERENCE TO RELATED APPLICATION

This application is a Continuation-in-Part application of U.S. patent application Ser. No. 10/410,115 for an Apparatus and Method for removing Odor From Animal Deposits filed by the same inventor on Apr. 9, 2003 now abandoned and incorporated herein by reference and now abandoned

FIELD OF THE INVENTION

This invention relates to an apparatus and method for removing odor from animal deposits. In particular, according to one embodiment, the invention relates to an apparatus and method for removing odor from a cat litter box with an opening. A germicidal emission device is connected to the inside of the cat litter box, according to this embodiment, such that no germicidal emissions are directed at the opening. The germicidal emission device is also connected to a power source. A motion detector is connected to the inside of the cat litter box such that the motion detector detects motion, through the opening, outside of the cat litter box. The motion detector is also connected to the power source and to the germicidal emission device and is conformed to turn off the germicidal emission device when motion is detected inside or outside of the cat litter box.

BACKGROUND OF THE INVENTION

Considerable effort has been directed to the problem of removing odor from animal deposits. By way of example only, and not by any limitation, entire industries have been developed to address the problem of removing odor from cat deposits in cat litter boxes. The prior art is primarily focused on devices that aid in the removal of the deposits, the absorption of liquid deposits and the masking of odor by perfumes and air filters and the like. While burial of the deposits within a perfumed litter material may partially hide the odor so long as the deposit is covered, eventually deposits will become uncovered or remain uncovered as the cat uses the litter box. At this point, perfumes and filters do little to diminish the odor and do nothing in the nature of removing the odor altogether.

Still further, enclosed cat litter boxes are provided with doorways such that the cat enters the enclosed litter box, uses the litter box as intended, and leaves the litter box with the deposit inside. Such litter boxes may include perfumed litter material, air filters, and the like in an attempt to trap odors within the enclosed litter box. Nonetheless, odors do escape and, importantly, they have certainly not been removed but have only been perfumed at best.

Representative prior art of which Applicant is aware are:

Gantt, U.S. Pat. No. 6,857,391 discloses a square animal toilet box with a complex movable floor that uses UV light to dry and sanitize the floor after the floor is flushed.

Deal, U.S. Pat. No. 6,656,424 discloses an ultraviolet area sterilizer using a combination of UVC light and motion detectors to detect motion within an enclosed space.

Ball, U.S. Pat. No. 4,998,504 discloses a topless rectangular disposable pet litter box and the use of UV light.

Petkovzki, U.S. Pat. No. 5,755,181 discloses an open framed electro-mechanical cat litter box and the use of timed sensors Despite this art, Applicant is aware of no invention that discloses or suggests the invention as set forth herein.

SUMMARY OF THE INVENTION

The apparatus and method for removing odor from animal deposits of the present invention includes, according to one embodiment, a container with an opening. A germicidal emission device is attached inside the container and is positioned such that no germicidal emissions are directed at the opening. A power source is connected to the germicidal emission device. A motion detector is connected inside the container such that the motion detector detects motion through the opening outside of the container and, further, the motion detector is connected to the power source and to the germicidal emission device such that the motion detector turns on the germicidal emission device when no motion is detected.

According to another aspect of the invention, the container includes a roof with a front and a back with a sloped section that slopes from the front at least part of the way to the back of the roof and the germicidal emission device and the motion detector are connected to the inside of the sloped section. In another aspect, the container opening is angled. In a further aspect, the container opening includes a top and a bottom and at least part of the opening is angled from the top to the bottom toward the inside of the container. According to a further aspect, the container includes a sloped roof section and the germicidal emission device and the motion detector are connected to the inside of the sloped roof section and the container opening is angled toward the inside of the container.

In another aspect, the container includes a sloped roof section that creates an angle of approximately 80-degrees and within which angle the germicidal emission device is located. In accordance with a further embodiment, a preselected delay is provided during which no motion must be detected inside or outside before the germicidal emission device is turned on. In a further embodiment, a passive infrared (PIR) motion detector device is used so as to detect the presence of heat from an animal in addition to motion. According to a further aspect of the invention the inside of the container is not smooth and includes a texture.

In another embodiment of the invention, in a cat litter box with an opening, an inside and an outside, and a sloped roof, an apparatus for removing odor from cat deposits includes a germicidal emission device connected to the inside of the sloped roof of the cat litter box such that no germicidal emissions are directed at the opening and where the germicidal emission device is a UVC light emitting device. A power source is connected to the germicidal emission device and is conformed to provide power for operation of the UVC light emitting device. A motion detector is connected to the inside of the sloped roof such that the motion detector detects motion through the opening outside of the cat litter box and inside the cat litter box and where the motion detector is connected to the power source and to the germicidal emission device and is conformed to turn off the UVC light emitting device when motion is detected.

According to another embodiment of the invention, a method of removing odor from cat deposits includes the steps of providing a container with a partially sloped roof and an opening where a germicidal emission device is connected to the partially sloped roof on the inside of the container such that no germicidal emissions are directed at the opening and where a power source is connected to the germicidal emission device and where a motion detector is connected to the partially sloped roof such that said motion detector detects motion through the opening outside of the container and where the motion detector is connected to the power source and to the germicidal emission device such that the motion detector turns off the germicidal emission device whenever motion is detected inside or outside of said container, turning on the power source; and isolating pet deposits in the inside of the container.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
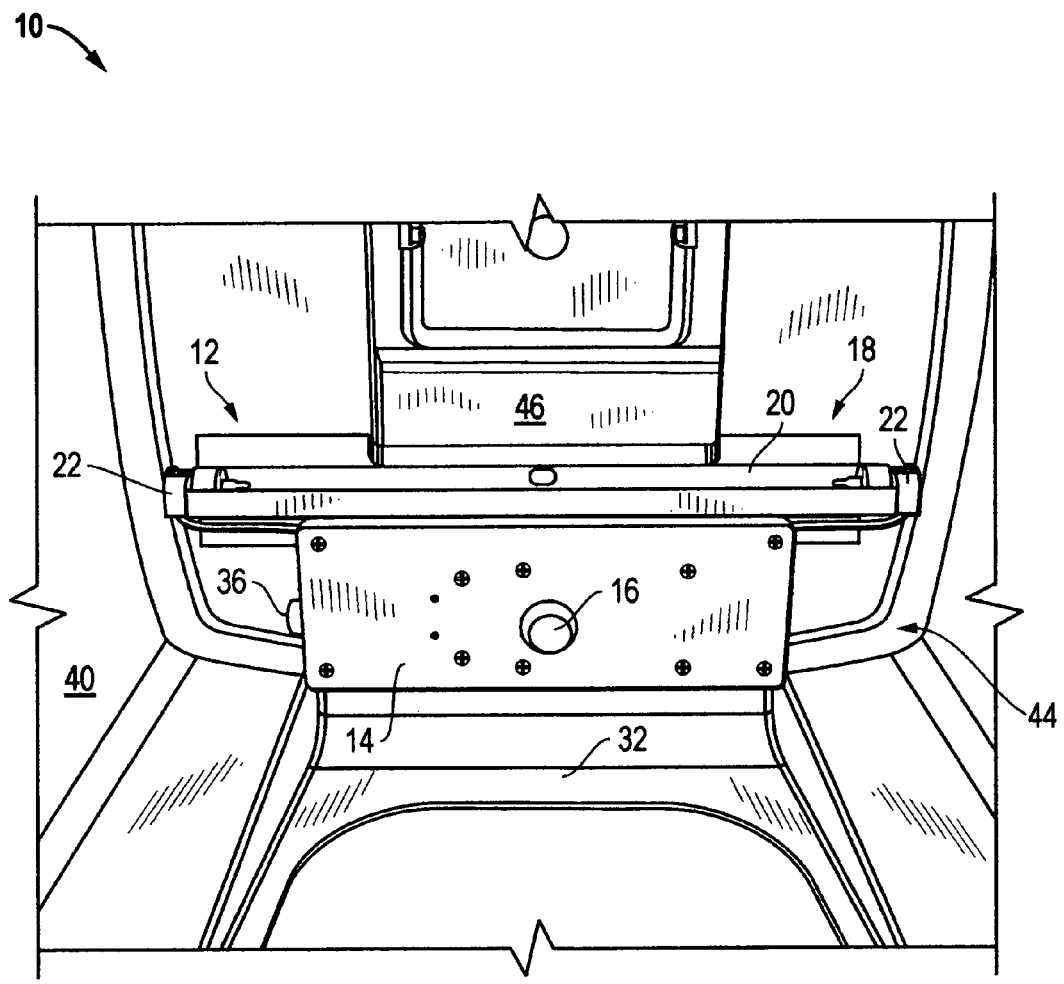
FIG. 1 is a view of the odor removing apparatus of the present invention secured in place in the top interior of a cat litter box.

An embodiment of the present invention is illustrated by way of example in FIGS. 1-5. With specific reference to FIGS. 1 and 2, apparatus for removing odor from animal deposits 10 according to an embodiment of the present invention includes a germicidal emission device 12. Germicidal emission device 12 is connected to power source 14. Power source 14 is also connected to motion detector 16 and motion detector 16 is connected to germicidal emission device 12. According to this embodiment, motion detector 16 is connected such that it turns on germicidal emission device 12 when no motion is detected. Said another way, when motion is detected, according to this embodiment, motion detector 16 prevents germicidal emission device 12 from turning on. In accordance with a further embodiment, motion detector 16 is conformed so as to turn off germicidal emission device 12 when motion is detected. According to one embodiment, germicidal emission device 12 is a UVC light emitting device 18.

In another embodiment, UVC light emitting device 18 is a UVC light bulb 20. Germicidal emission device 12, for the purposes of the present invention, may be any germicidal emission device now known or hereafter developed such that odors are destroyed from animal deposits and not merely covered up or masked. That is to say, germicidal emission device 12 may be any liquid, gas, or electrical device now known or hereafter developed. Again, according to one embodiment, germicidal emission device 12 is a UVC light bulb 20. Applicant has found that a 12 inch, 8 watt germicidal UVC light bulb, USHIO brand number G8T5, provides the needed germ destroying light. Certainly any size and power light necessary for the intended use is suitable for the purposes of the invention.

Germicidal emission device 12 is held in place by socket assembly 22. According to one embodiment, socket assembly 22 holds and locates UVC light bulb 20 as illustrated. Power source 14 may be any known power source or power source hereafter developed. Power source 14 may be a battery or a direct electrical connection to an electrical outlet, for purposes of example only. Importantly, whatever power source 14 is provided for the power input necessary to operate motion detector 16 and germicidal emission device 12, the power output to germicidal emission device 12 and motion detector 16 must be appropriate for their operation. For example only, in a situation where apparatus for removing odor from animal deposits 10 uses as its power source 14 a connection to a standard United States electrical outlet providing 110 volts, a power adapter must be provided in power source 14. For example only, in the situation where the 8 watt germicidal UVC bulb 20 described above is the germicidal emission device 12 of choice, Applicant has determined that a 12 V, 500 ma AC RADIO SHACK brand adapter No. 273-1773 supplies the power output needed by both the UVC light bulb 20 and the motion detector 16 in appropriate form.

Figure 2:
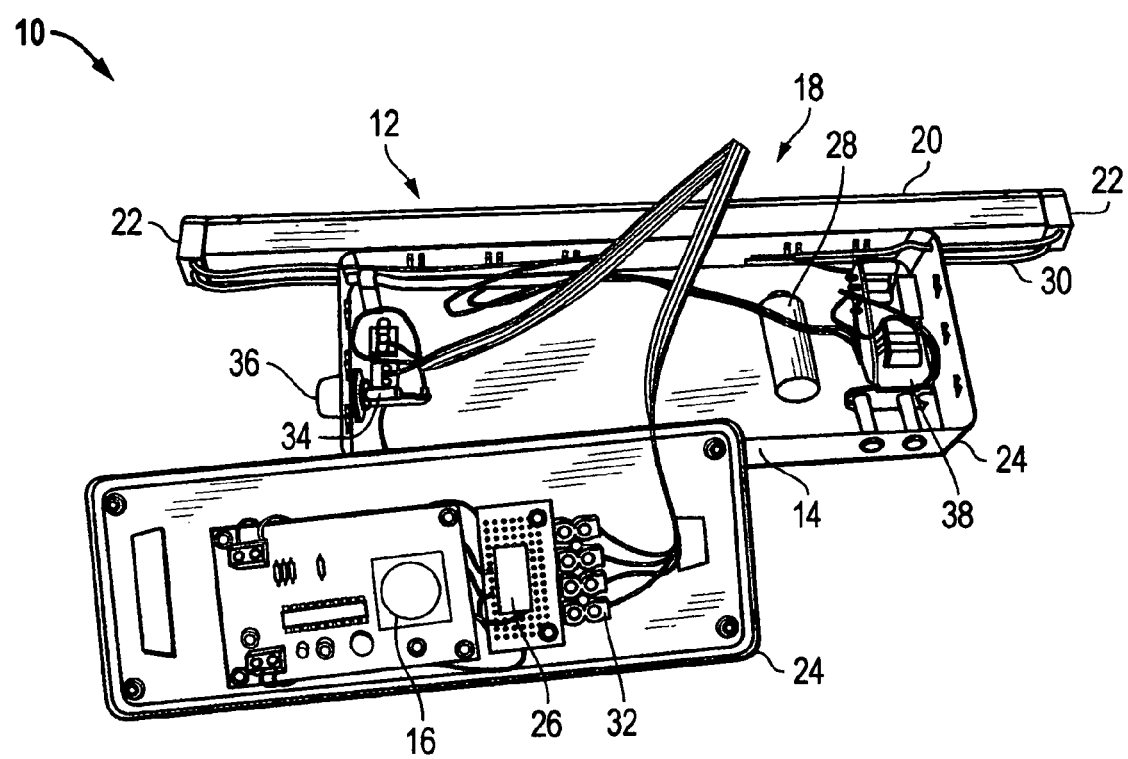
FIG. 2 is a view of the internal mechanisms of the motion detector device and the light emitting device according to the embodiment of the invention disclosed in FIG. 1.

Referring now to FIG. 2, housing 24, according to one embodiment of the invention, is shown disassembled. Housing 24 protects power source 14, motion detector 16, and the germicidal emission device's 12 operational elements as will be disclosed hereafter. Motion detector 16, as with other elements of apparatus for removing odor from animal deposits 10, may be any motion detector now known or hereafter developed. Applicant has determined that a suitable motion detector 16 is provided by the DIY brand IR motion detector kit No. K.-30. In accordance with the invention, Applicant utilizes motion detector 16 to shut off the UVC light bulb 20 in the presence of motion, human, animal, or otherwise, at or near the location of motion detector 16. Applicant has determined that the NTE brand electronics relay number R40-11 D2-12 is appropriate for use as a relay 26. When motion detector 16 senses motion, its output energizes the relay 26 and shuts off UVC light bulb 20 so long as motion is sensed. Further, according to another embodiment of the invention, a predetermined delay may be built in such that power is prevented from being sent to germicidal emission device 12 for a predetermined time period. For example only, a fifteen to twenty second delay may be built in to delay the operation of germicidal emission device 12 after movement ceases to be detected. In accordance with this embodiment, after the predetermined delay, relay 26 is then de-energized and germicidal emission device 12 is reactivated. In this manner, germicidal emission device 12 only operates in the absence of animal and human use. Any motion at or near its location causes motion detector 16 to incapacitate germicidal emission device 12 and thereby prevent harm to animals and humans alike.

According to another embodiment, a passive infrared (PIR) motion detector 16 may be utilized such that the germicidal emission device 12 is prevented from operating when infrared heat is detected as well as when motion is detected. This embodiment prevents the accidental irradiation of the family pet that has decided to take a nap in the litter box. That is, in this situation, infrared heat radiating from the body of the sleeping, and therefore essentially motionless, animal prevents the germicidal emission device 12 from operating too.

As discussed above, housing 24 may include a battery 28 or be connected by connection 30 to a source of electrical power such as a household electrical outlet (not shown). In any case, junction 32 is used to connect motion detector 16 and relay 26 to connection 30. Applicant has also provided a fuse 34 and fuse holder 36 to protect the invention from overload from any electrical source. Fluorescent starter circuit 38, as is known in the art, is utilized for starting germicidal emission device 12 UVC light bulb 20.

Referring again to FIG. 1, according to an embodiment of the present invention, apparatus for removing odor from animal deposits 10 is utilized in conjunction with a cat litter box 40. Obviously, cat litter box 40 maybe any container for handling animal deposits now known or hereafter developed. Cat litter box 40 includes a cat doorway 42 providing access to the interior 44 of cat litter box 40. FIG. 1 illustrates apparatus for removing odor from animal deposits 10 attached to the interior roof 46 close to the cat doorway 42. In this embodiment, motion detector 16 detects motion of any sort, at cat doorway 42, for example, and operates as discussed above. After a certain period, according to one embodiment, motion detector 16, having detected no motion, operates to energize germicidal emission device 12 such that, according to one embodiment, UVC light bulb 20 operates.

By way of contrast, Applicant's apparatus for removing odor from animal deposits 10 effectively removes odor from animal deposits and sanitizes all exposed surfaces. Prior art devices, as discussed above, simply partially mask or perform odors without removing them. While any germicidal emission device 12 may be utilized, for the purposes of further discussion, UVC light bulb 20 irradiates odor producing animal deposits and exposed surfaces with an odor killing germicidal light. As a result, in accordance with Applicant's invention, odor from deposits is removed from the animal deposits as opposed, again, to being simply covered up.

Figure 3:
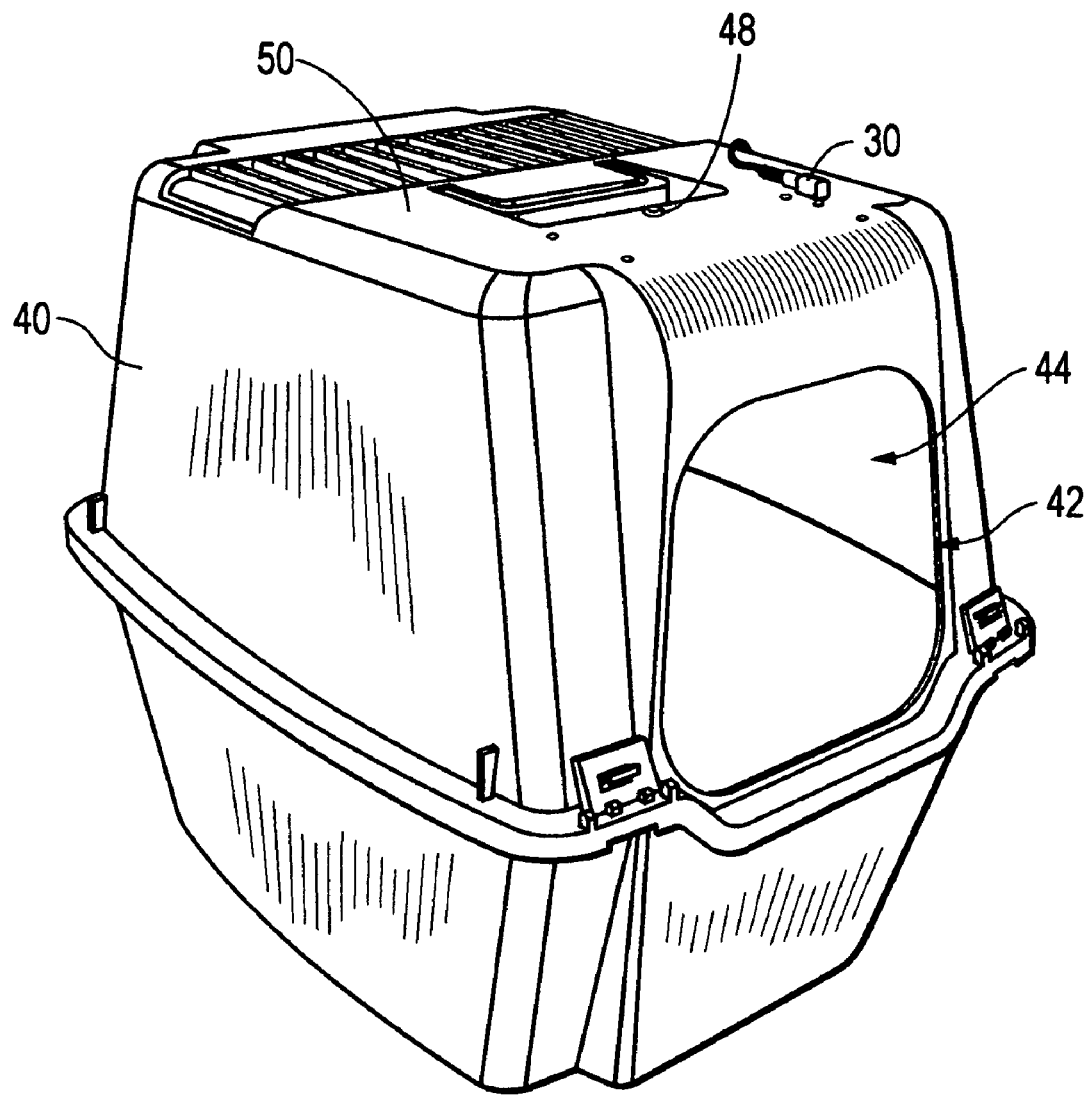
FIG. 3 is a perspective view of a cat litter box in accordance with the invention disclosed in FIGS. 1 and 2.

Referring now to FIG. 3, cat litter box 40, representative of any enclosure now known or hereafter developed, is illustrated. Cat litter box 40 includes a cat doorway 42 as discussed. An electrical connection 30 is shown whereby apparatus for removing odor from animal deposits 10 can be connected to a common household electrical outlet (not shown). According to one embodiment, in operation, a user selects an enclosure, such as cat litter box 40, within which to isolate animal deposits. Cat litter is deposited within the litter box 40 as is known. Thereafter, germicidal emission device 12 is connected to the interior 44 roof 46 of cat litter box 40, as illustrated in FIG. 1. Additionally, power source 14 and motion detector 16 may be connected to the interior 44 of cat litter box 40 as illustrated, or placed in any convenient location. Motion detector 16 is connected to power source 14 and germicidal emission device 12 as disclosed above such that the motion detector 16 turns off germicidal device 12 whenever motion is detected.

Once apparatus for removing the odor from an animal deposits 10 is connected as discussed, odor is automatically removed from animal deposits without human intervention. For example, the household cat enters through cat doorway 42 and leaves animal deposits on the interior 44. As soon is the animal approaches and its presence is detected by motion detector 16, germicidal emission device 12 is shut off. As a result, the household pet is not subject to irradiation and is in no danger of suffering any damage whatsoever from germicidal emission device 12. Additionally, according to one embodiment, even after the animal has left the enclosure, a delay prevents the operation of germicidal emission device 12 for some predetermined period. This prevents the operation of the germicidal emission device 12 from inadvertently operating while an animal is present. After the predetermined delay, the germicidal emission device 12 is activated. Further, in accordance with another embodiment, a PIR motion detector 16 detects the presence of a motionless animal and prevents the inadvertent irradiation of the animal. As is obvious to anybody of ordinary skill in the art, Applicant's apparatus for removing odor from animal deposits 10 uses only the power necessary to operate an ordinary night light. This power is nonetheless sufficient to continuously and constantly remove, strip, and sanitize animal deposits and exposed surfaces from odor emanating therefrom.

FIG. 3 also illustrates an "in operation" lens 48, or window, in the top 50 of the cat litter box 40. Whenever germicidal emission device 12 is "on", in operation lens 48 provides a user with a sure visual indication that it is operating.

Figure 4:
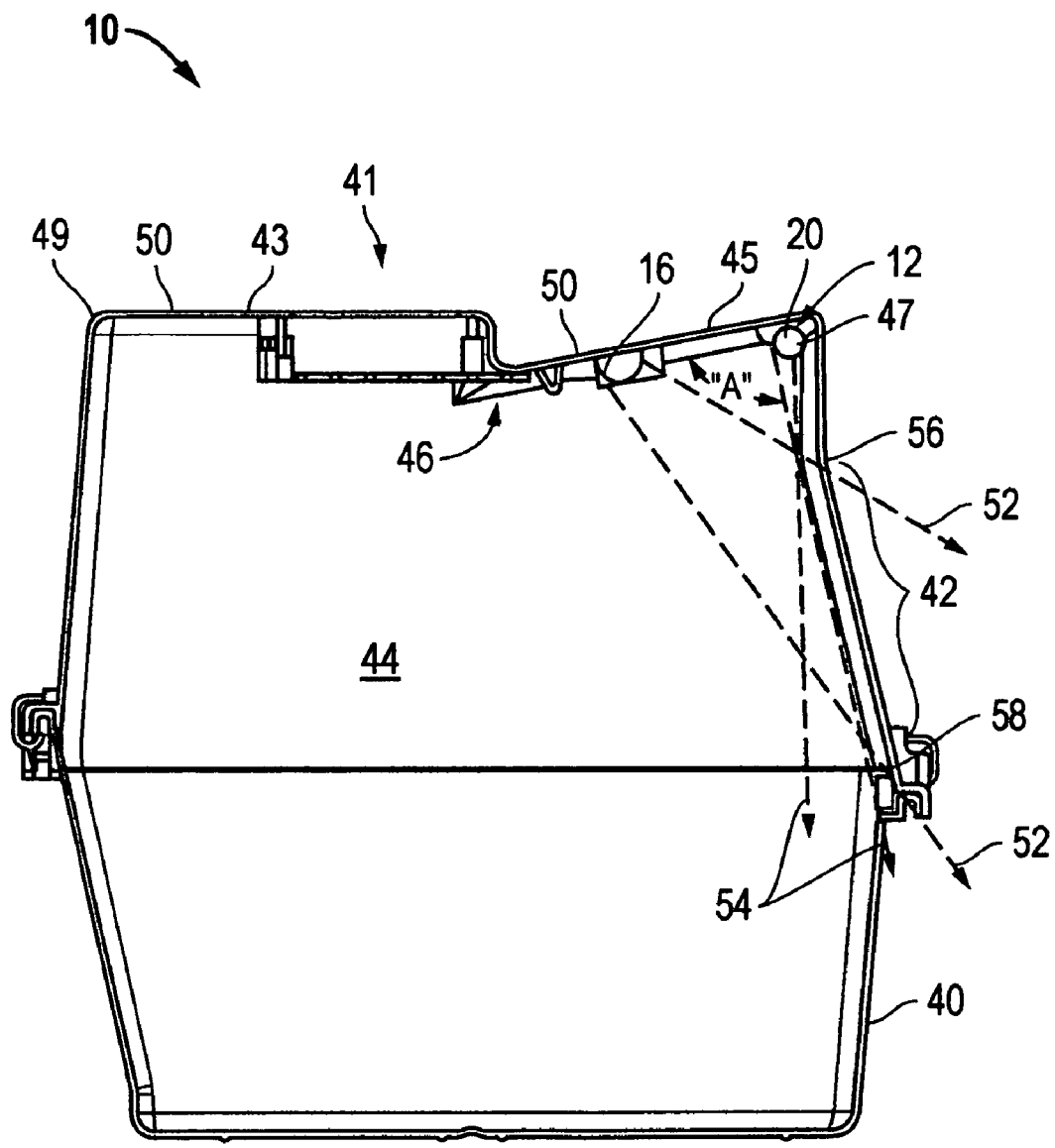
FIG. 4 is a side cross section view of the odor removing apparatus of the present invention according to one embodiment showing the sloped roof of the container with an angled opening and illustrating that the germicidal emission device does not direct any germicidal emissions at the opening and that the motion detector does detect motion through the opening and outside of the container.

Referring now to FIG 4, another embodiment of the invention is described. As shown in this cross section view, according to this embodiment, cat litter box 40 includes a roof 41. Roof 41 includes a flat section 43, a sloped section 45, a front 47 and a back 49. The sloped section 45 of roof 41 slopes from front 47 toward back 49. As shown, sloped section 45 includes approximately one-half of roof 41. Sloped section 45 may include all or part of roof 41. According to a preferred embodiment, the sloped section 45 creates and angle "A", as shown in FIG. 4, of approximately 80-degrees. By locating motion detector 16 as shown in the sloped section 45 on the inside 44 of cat litter box 40, motion detector 16 detects motion outside of cat doorway 42 as shown by the detection arrows 52.

Likewise, by locating germicidal emission device 18 as shown in the sloped section 45 on the inside 44 of cat litter box 40, germicidal emission device 18 does not direct any germicidal emissions at cat doorway 42 as shown by emission arrows 54. The closest the germicidal emissions get is parallel to the inside of the cat doorway 42. As illustrated, a preferred position for the location of germicidal emission device 18 is in the uppermost corner of the inside roof 46 of sloped section 45 at the front 47.

Another features of this embodiment of the invention is that cat doorway 42 is angled as illustrated in FIG. 4. Cat doorway 42 has a top 56 and a bottom 58 and the cat doorway 42 is preferably angled from the top 56 to the bottom 58 toward the interior 44 of cat litter box 40 as shown. The figure shows that the entire cat doorway 42 is angled inward. Some or all of the cat doorway 42 may be angled. In combination, however, in accordance with one embodiment, sloped section 45 of roof 41 and angled cat doorway 42 enable the placement of motion detector 16 so that motion detector 16 detects motion on the inside 44 and the outside of cat litter box 40. Any such combination of sloped section 45 and angled cat doorway 42 that accomplishes the requirements of the invention are within the scope of the invention.

Figure 5:
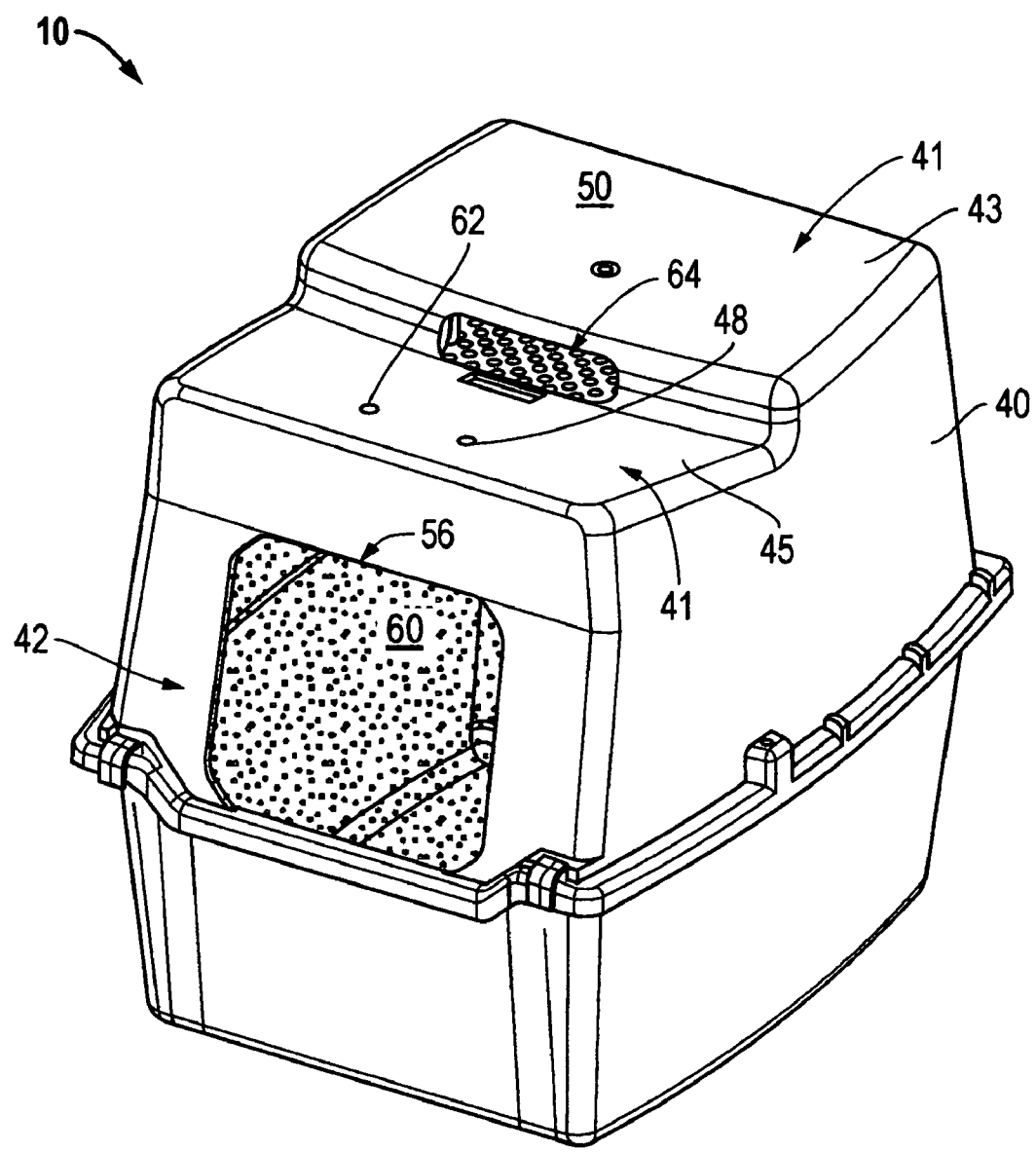
FIG. 5 is a perspective view of the enclosure of FIG. 4 showing the partially angled roof and the angled opening.

Referring now to FIG. 5, a perspective view of the embodiment of the invention of FIG. 4 is shown. One embodiment of the invention is shown where the inside 44 of cat litter box 40 is not smooth but includes texture 60. Preferably, a pebble texture 60 is added to the inside 44 so as to increase the surface area of the inside 44. The increased surface area and rougher surface, Applicant has determined, allows more absorption of the UVC light and thus increases the effectiveness of the invention. Any texture 60 is suitable that effectively increases the surface area.

Other features of the invention are shown in FIG. 5, including power available light 62 and integral handle 64. According to one embodiment, integral handle 64 is formed at the connection of sloped section 45 and flat section 43 of roof 41. This eliminates the need for adding a carrying handle.

Importantly, again, Applicant's invention ensures that no UVC light whatsoever escapes from cat litter box 40. UVC is the Ultraviolet wavelength in the 254 NM frequency (germicidal band). It is destructive to all organic things. Paints, wood, plastics, carpet, vinyl tile, cloth, plants, and all life forms. UVC strips the oils and moisture from things it contacts and kills the germ by destroying any organic cells it encounters. Thus, Applicant's invention is conformed so as to keep the direct influence of the UVC within the cat litter box at all times. Further, the invention allows detection of motion inside and outside of the cat litter box, a unique and extraordinarily effective combination.

While the apparatus for removing odor from animal deposits 10 has been disclosed in connection specifically with a cat litter box, it should be appreciated that the apparatus can be used in other animal deposit situations. The present invention provides an improved odor removing apparatus and method which can be easily incorporated into other situations including small animals and large animals.

While the present invention has been disclosed in connection with the preferred embodiment thereof, it should be understood that there may be other embodiments which fall within the spirit and scope of the invention is defined by the following claims.

What is claimed is:

1. An apparatus for removing odor from animal deposits comprising:
   a) a container with an opening;
   b) a germicidal emission device attached inside said container positioned such that no germicidal emissions are directed at said opening;
   c) a power source connected to said germicidal emission device; and
   d) a motion detector connected inside said container such that said motion detector detects motion through said opening outside of said container and inside said container, wherein said motion detector is connected to said power source and to said germicidal emission device such that said motion detector turns on said germicidal emission device when no motion is detected and said motion detector is conformed so as to turn off said germicidal emission device when motion is detected outside said container.

2. The apparatus of claim 1 wherein said container includes a roof with a front and a back with a sloped section that slopes from the front at least part of the way to the back of the roof and wherein said germicidal emission device and said motion detector are connected to said inside of said sloped section.

3. The apparatus of claim 1 wherein said container opening is angled.

4. The apparatus of claim 1 wherein said container opening includes a top and a bottom and at least part of the opening is angled from the top to the bottom toward the inside of said container.

5. The apparatus of claim 1 wherein said container includes a sloped roof section wherein said germicidal emission device and said motion detector are connected to said inside of said sloped roof section and wherein said container opening is angled toward the inside of said container.

6. The apparatus of claim 1 wherein said container includes a sloped roof section that creates an angle of approximately 80-degrees and within which angle said germicidal emission device is located.

7. The apparatus of claim 1 wherein said motion detector further includes a PIR detector.

8. The apparatus of claim 1 wherein motion detector further comprises a preselected delay period during which no motion must be detected inside or outside of said container before said germicidal emission device is turned on.

9. The apparatus of claim 1 wherein said inside of said container is not smooth and includes a texture.

10. In a cat litter box with an opening, an inside and an outside, and a sloped roof, an apparatus for removing odor from cat deposits, the apparatus comprising:
    a) a germicidal emission device connected to the inside of the sloped roof of the cat litter box such that no germicidal emissions are directed at the opening, wherein the germicidal emission device is a UVC light emitting device;
    b) a power source connected to the germicidal emission device conformed to provide power for operation of the germicidal emission device; and
    c) a motion detector connected to the inside of the sloped roof such that the motion detector detects motion through the opening outside of the cat litter box and inside the cat litter box, wherein the motion detector is connected to the power source and to the germicidal emission device such that the germicidal emission device is turned off when motion is detected and said motion detector is conformed so as to turn off said germicidal emission device when motion is detected outside said container.

11. The apparatus of claim 10 wherein the motion detector further comprises a timer delay conformed to turn on the germicidal emission device after a predetermined period of time during which no motion is detected outside of the cat litter box.

12. The apparatus of claim 10 wherein the sloped roof includes a roof with a front and a back with a sloped section that slopes from the front approximately half way to the back of the roof.

13. The apparatus of claim 10 wherein the cat litter box opening is angled.

14. The apparatus of claim 10 wherein the cat litter box opening includes a top and a bottom and the entire opening is angled toward the inside of the cat litter box from the top to the bottom of the opening.

15. The apparatus of claim 10 wherein the inside of the cat litter box is not smooth and includes a pebble texture.

* * * * *